United States Patent
Murakami et al.

(10) Patent No.: US 10,343,207 B2
(45) Date of Patent: Jul. 9, 2019

(54) METAL JOINT BODY AND APPARATUS FOR MANUFACTURING THE METAL JOINT BODY

(71) Applicant: Yazaki Corporation, Tokyo (JP)

(72) Inventors: Kazuhiro Murakami, Susono (JP); Yoshihiko Watanabe, Susono (JP)

(73) Assignee: Yazaki Corporation, Tokyo (JP)

( * ) Notice: Subject to any disclaimer, the term of this patent is extended or adjusted under 35 U.S.C. 154(b) by 65 days.

(21) Appl. No.: 15/609,681

(22) Filed: May 31, 2017

(65) Prior Publication Data

US 2017/0259322 A1    Sep. 14, 2017

Related U.S. Application Data (62) Division of application No. 12/923,305, filed on Sep. 14, 2010.

(30) Foreign Application Priority Data

Sep. 25, 2009  (JP) ................................. 2009-220149

(51) Int. Cl.
  *B21D 39/03*  (2006.01)
  *F16B 1/00*  (2006.01)
  *F16B 5/04*  (2006.01)

(52) U.S. Cl.
  CPC ............. *B21D 39/03* (2013.01); *F16B 5/045* (2013.01); *F16B 2001/0064* (2013.01); *Y10T 428/12368* (2015.01)

(58) Field of Classification Search
  CPC ....... B21D 39/03; B21D 39/034; F16B 5/045; F16B 2001/0064; Y10T 428/12368
  See application file for complete search history.

(56) References Cited

U.S. PATENT DOCUMENTS

| 2,135,807 A | 11/1938 | Fitzgerald |
| 2,426,670 A | 9/1947 | Cooley |
| 2,477,839 A | 8/1949 | Vanderweil |
| 2,663,072 A | 12/1953 | Pfistershammer |

(Continued)

FOREIGN PATENT DOCUMENTS

| DE | 2260339 A1 | 6/1974 |
| DE | 19816502 A1 | 11/1998 |

(Continued)

OTHER PUBLICATIONS

FR 2358214 A1 Machine Translation (Year: 1978).*

(Continued)

*Primary Examiner* — Jacob J Cigna
*Assistant Examiner* — Lee A Holly
(74) *Attorney, Agent, or Firm* — Locke Lord LLP (57) ABSTRACT

A miniaturized metal joint body and an apparatus for manufacturing the metal joint body to be improved about strength are provided. By cutting three overlapped metal sheets along a first cutting line and a pair of second cutting lines extending so as to intersect the first cutting line at each end of the first cutting line and pressing areas surrounded with the first cutting line and the pair of second cutting lines and each of a pair of bending lines connecting both ends of the pair of second cutting lines, each of the pairs of projecting members is formed so as to project in a pressing direction of arrow Z.

11 Claims, 5 Drawing Sheets

(56) References Cited

U.S. PATENT DOCUMENTS

| | | | |
|---|---|---|---|
| 2,924,312 A | 2/1960 | Williams | |
| 3,083,794 A | 4/1963 | Stovall, Jr. | |
| 3,728,779 A | 4/1973 | Behlen et al. | |
| 4,160,182 A | 7/1979 | Mitsui | |
| 4,264,663 A | 4/1981 | Beenken | |
| 5,577,313 A | 11/1996 | Guido et al. | |
| 5,718,142 A | 2/1998 | Ferraro | |
| 6,115,905 A | 9/2000 | Ueta | |
| 7,762,034 B2 | 7/2010 | Jankovec et al. | |
| 8,240,678 B2 | 8/2012 | Ueta | |
| 2009/0068399 A1 | 3/2009 | Murakami et al. | |
| 2011/0076510 A1 | 3/2011 | Murakami et al. | |
| 2011/0318598 A1 | 12/2011 | Murakami et al. | |

FOREIGN PATENT DOCUMENTS

| | | | | |
|---|---|---|---|---|
| FR | 2358214 A1 * | 2/1978 | ........... | B21D 39/034 |
| JP | H6-262276 A | 9/1994 | | |
| JP | 2003-181572 A | 7/2003 | | |
| JP | 2003244872 A | 8/2003 | | |
| JP | 2007228664 A * | 9/2007 | | |
| JP | 2009-066616 | 4/2009 | | |
| WO | WO-2008023448 A1 | 2/2008 | | |

OTHER PUBLICATIONS

JP 2007228664 A Machine Translation (Year: 2007).*
Japanese Office Action dated Oct. 1, 2013 for corresponding Japanese Patent Application No. 2009-220149.
Chinese Office Action dated Nov. 5, 2013 for corresponding Chinese Patent Application No. 201010287086.2.
Japanese Office Action dated May 20, 2014 for corresponding Japanese Patent Application No. 2009-220149.
Machine translation of JP 2007-228664, Sep. 2007.

* cited by examiner

METAL JOINT BODY AND APPARATUS FOR MANUFACTURING THE METAL JOINT BODY

TECHNICAL FIELD

This invention relates to a metal joint body and an apparatus for manufacturing the metal joint body, especially a metal joint body which is formed by joining two or more metal sheets to each other, and an apparatus for manufacturing the metal joint body by joining two or more metal sheets to each other.

BACKGROUND ART

In general, a method of clamping and adhering metal sheets to each other by pressure is known as a method for joining metal sheets to each other. The joining by adhering by pressure depends on residual stress by clamping and contact, so that electric characteristics thereof are not satisfied. At a contact area of the metal sheets, there are many gaps so that it is has a problem that the electric characteristics cannot be easily maintained in a long period because of corrosion. For maintaining the electric characteristics, it is considerable to welding the metal sheets to each other by melting the metal sheets with gas or plasma. It is not easily to be automatized and not suitable for mass production and has a cost problem.

Figure 10:
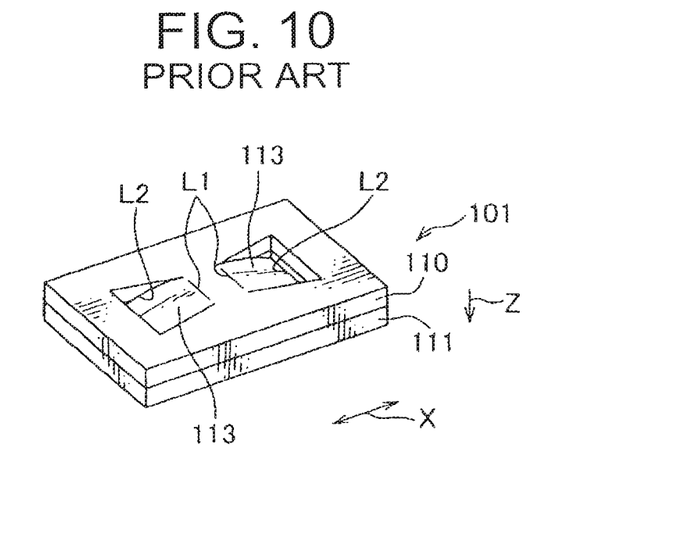
FIG. 10 is a perspective view of a metal joint body by prior art.
Figure 11:
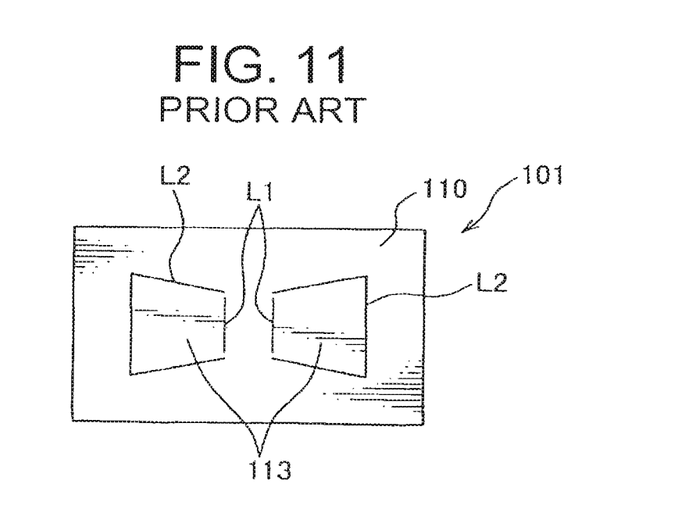
FIG. 11 is a top view of the metal joint body shown in FIG. 10.

For overcoming the above problems, a patent document 1 proposes a method for joining sheet metals, in which the metal sheets 110, 111 are joined as shown in FIGS. 10, 11 by cutting the two metal sheets 110, 111 along a cutting line L2 from one end of a bending line L1, extending vertically apart from the bending line L1, toward the other end of the bending line L1, and by pressing and bending an area surrounded with the cutting line L1 and bending line L2 of the two metal sheets 110, 111 about the bending line L1. According to the method, outer surrounding cutting surfaces along the cutting line L2 of the metal sheet 110 is pushed so as to rub on inner surrounding cutting surfaces along the cutting line 2 of the metal sheet 111. By rubbing on each other, oxidized surface thereof is removed and fresh surface is exposed, and the both outer and inner cutting surfaces are adhered so as to generate a metal contact area of the metal sheets. A metal joint body 101 having the metal contact area is provided with a pair of projecting members 113 projecting in a pressing direction (i.e. arrow Z) by pressing the area surrounded with the cutting line L2 and the bending line L1. Each one of the projecting members 113 is formed into a trapezoidal shape in a top view, and arranged with a space therebetween so as to oppose each short side (i.e. the bending line L1) of the pair of projecting members 113 formed into the trapezoidal shape.

A die used for pressing the two metal sheets 110, 111 includes a pair of press jigs formed gradually narrowing toward a top end thereof. The pair of press jigs is arranged with a space corresponding to the pair of projecting members 113 formed into a trapezoidal shape.

CITATION LIST

Patent Document

Patent Document 1: Japan Patent Application Published No. 2009-66616

SUMMARY OF INVENTION

Objects to be Solved

In the metal joint body 101 by prior art, for preventing the metal sheets 110, 111 from tearing (breaking) when pressing the two metal sheets 110, 111, the two bending lines L1 are arranged with a space therebetween. Thereby, the metal joint body 101 may be increased in a direction of row of the two bending lines L1 (direction of arrow X).

The die is provided with the pair of press jigs arranged with a space therebetween, so that the press jigs cannot be formed to have enough strength, and the press jigs may be easily broken.

According to the above problems, an object of the present invention is to provide a metal joint body which is miniaturized and an apparatus for manufacturing the metal joint body, which apparatus is improved about the strength.

How to Attain the Object of the Present Invention

In order to overcome the above problems and attain the object, the present invention is to provide a metal joint body, which includes a pair of projecting members formed by cutting two or more overlapped metal sheets along a first cutting line and a pair of second cutting lines extending so as to intersect the first cutting line at each end of the first cutting line and pressing areas surrounded with the first cutting line and the pair of second cutting lines and each of a pair of bending lines connecting both ends of the pair of second cutting lines so as to bend the each area about the bending line and project the areas in a direction of pressing, and a hole formed by arranging the projecting members, and a metal contact area arranged between an outer surrounding cutting surface of the projecting member arranged at a first metal sheet of the metal sheets located at a pressing side and an inner surrounding cutting surface of the hole arranged at a position to oppose to the outer surrounding cutting surface and arranged in a second metal sheet of the metal sheets overlapped on the first metal sheet and located at a far side from the pressing side.

According to the present invention, each width of the projecting members and the hole along a direction parallel to the first cutting line is increasing toward the first cutting line.

According to the present invention, an apparatus for manufacturing the metal joint body by joining two or more metal sheets to each other includes a first die having a press hole formed into a shape same as the area surrounded with the pair of second cutting lines intersecting the first cutting line at each end of the first cutting line and the pair of bending lines connecting both ends of the pair of second cutting lines and being shallower from a bottom corresponding to the first cutting line toward each edge corresponding to the bending lines; and a second die having a press projection formed to be fitted to the press hole and be gradually narrower toward a top corresponding to the bottom of the press hole.

Effects of the Invention

According to the present invention, by cutting two or more overlapped metal sheets along the first cutting line and the pair of second cutting lines extending so as to intersect the first cutting line at each end of the first cutting line and pressing the areas surrounded with the first cutting line and the pair of second cutting lines and each of the pair of bending lines connecting both ends of the pair of second cutting lines so as to bend the each area about the bending line, the first cutting line is arranged between the pair of bending lines, so that the miniaturized metal joint body is manufactured along the direction of the row of the pair of bending lines.

According to the present invention, because each width of the projecting member and the hole along the direction parallel to the first cutting line is increasing toward the first cutting line, the projecting member is pushed into the hole. Thereby, in the outer surrounding cutting surface of the projecting member and the inner surrounding cutting surface of the hole, normal load is generated. Therefore, joining of the metal contact area is advanced, so that the electric characteristics and reliability thereof are improved.

In the die by prior art, a pair of press jig is arranged with a space therebetween at positions corresponding to each one of the pair of projecting members. According to the present invention, in the apparatus, one press projection die for forming the pair of projecting members is provided. Therefore, the press projection die can be formed with an enough size, so that the apparatus for manufacturing the metal joint body can be provided with the press projection die having improved strength.

DESCRIPTION OF EMBODIMENTS

A metal joint body of a first embodiment according to the present invention is described with reference to FIGS. 1-6.

Figure 5:
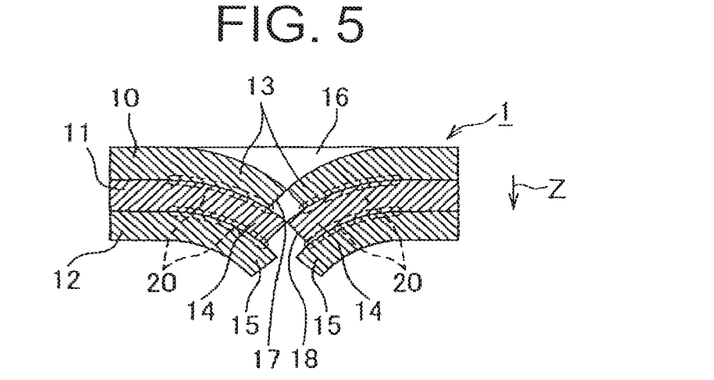
FIG. 5 is a cross-sectional view taken along the line V-V of the metal joint body shown in FIG. 2.
Figure 6:
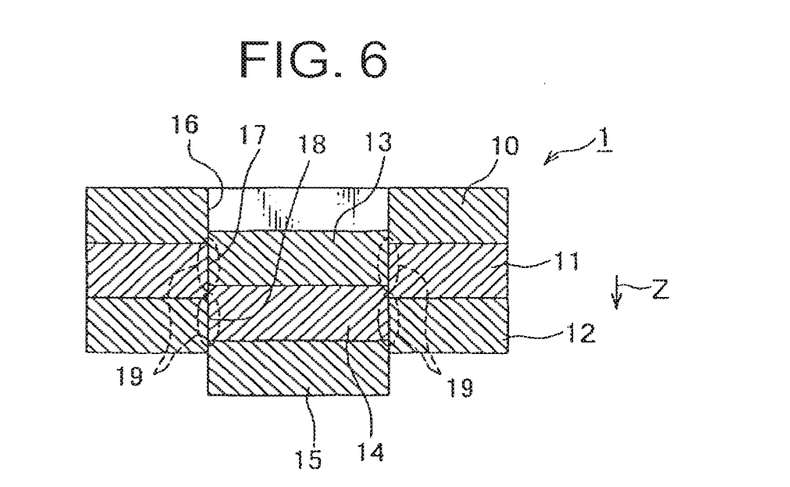
FIG. 6 is a cross-sectional view taken along the line VI-VI of the metal joint body shown in FIG. 2.

As shown in FIGS. 1-6, the metal joint body 1 includes three metal sheets 10, 11, 12 structured with, for example, the same material and the same thickness. As shown in FIGS. 5, 6, the metal joint boy 1 includes projecting members 13, 14, 15 and holes 16, 17, 18 and metal contact areas 19, 20.

Pairs of projecting members 13, 14, 15 are provided at each of metal sheets 10, 11, 12. Each of the pairs of projecting members 13, 14, 15 is formed by cutting three overlapped metal sheets 10, 11, 12 along a first cutting line L2 and a pair of second cutting lines L3 extending so as to intersect the first cutting line L2 at each end of the first cutting line L2 and pressing areas surrounded with the first cutting line L2 and the pair of second cutting lines L3 and each of a pair of bending lines L1 connecting both ends of the pair of second cutting lines L3 so as to bend the each area about the bending line L1 and project the areas in a pressing direction (arrow Z). A direction shown by an arrow X is a direction of row of the bending lines L1 and a direction of lengthwise of the metal sheets 10, 11, 12. A direction shown by an arrow Y is a direction parallel to the first cutting line L2 and a direction of widthwise of the metal sheets 10, 11, 12. A direction shown by an arrow Z is a direction of overlapping three metal sheets 10, 11, 12 and a direction of pressing the metal sheets 10, 11, 12.

Figure 2:
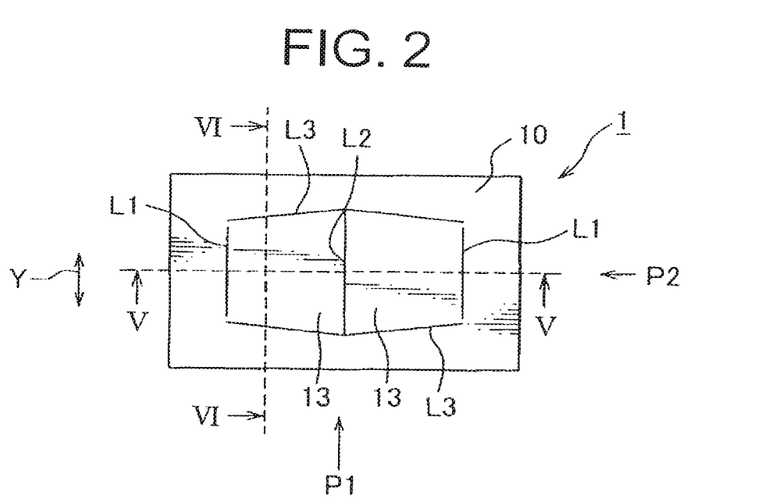
FIG. 2 is a top view of the metal joint body shown in FIG. 1.
Figure 3:
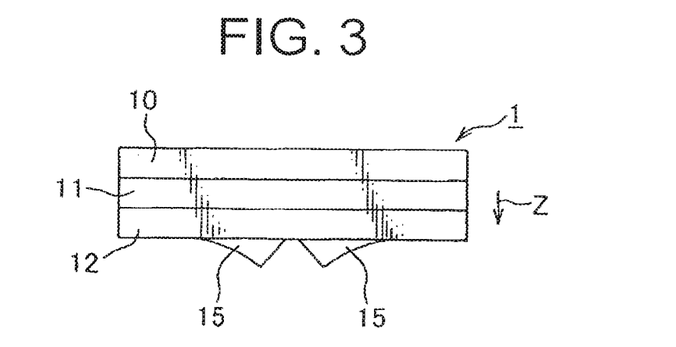
FIG. 3 is a view from an arrow P1 of the metal joint body shown in FIG. 2.
Figure 4:
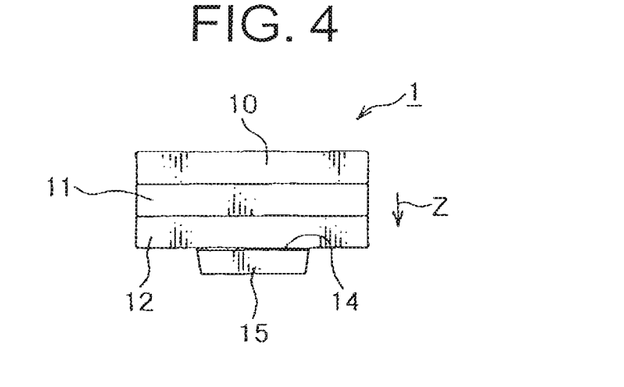
FIG. 4 is a view from an arrow P2 of the metal joint body shown in FIG. 2.

As shown in FIG. 2, each width of the projecting members 13, 14, 15 and holes 16, 17, 18 in the direction parallel to the first cutting line L2 (arrow Y) of the projecting members 13, 14, 15 and holes 16, 17, 18 is increasing toward the first cutting line L2. Thus, the metal joint body 1 is formed into a hexagonal shape surrounded with the pair of bending lines L1 arranging the first cutting line L2 therebetween, and the second cutting lines L3.

The holes 16, 17, 18 are shaped by forming the projecting members 13, 14, 15 at the metal sheets 10, 11, 12. The projecting member 13 at a first metal sheet 10 located at a pressing side in a pressing direction (along arrow Z) is pushed into the hole 17 at a second metal sheet 11 located adjacent to a surface of a far side from the pressing side in the pressing direction (arrow Z) of the first metal sheet 10. The projecting member 14 at the second metal sheet 11 located adjacent to the surface of the far side from the pressing side (arrow Z) of the first metal sheet 10 is pushed into the hole 18 at a third metal sheet 12 located adjacent to a surface of a far side from the pressing side of the second metal sheet 11. Thereby, the outer surrounding cutting surface of the projecting member 13 is pushed into the hole 17 so as to rub on the inner surrounding cutting surface of the hole 17, and the outer surrounding cutting surface of the projecting member 14 is pushed into the hole 18 so as to rub on the inner surrounding cutting surface of the hole 18. Oxidized surfaces of the outer surrounding cutting surfaces of the projecting members 13, 14 and the inner surrounding cutting surfaces of the holes 17, 18 are removed by rubbing and fresh surfaces thereof are exposed so that the outer surrounding cutting surfaces of the projecting members 13, 14 and the inner surrounding cutting surfaces of the holes 17, 18 are adhered and the metal contact areas 19 shown in FIG. 6 are formed. By pressing, the projecting members 13, 14, 15 are deformed so that the metal contact areas 20 shown in FIG. 20 are produced between overlapped projecting members 13, 14 and between overlapped projecting members 14, 15 by rubbing.

Figure 7:
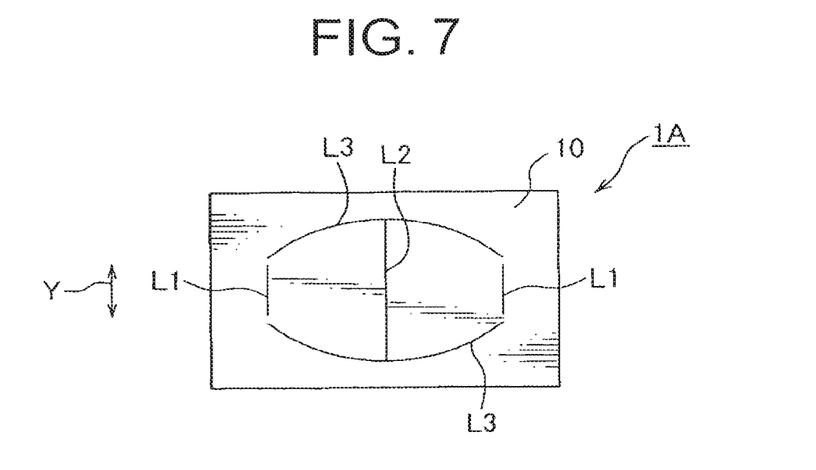
FIG. 7 is a top view of a metal joint body of a second embodiment according to the present invention.

A metal joint body of the second embodiment according to the present invention will be described with reference to FIG. 7. As shown in FIG. 7, the second cutting line L3 of the metal joint body 1A is arranged with an arc shape. The widths of the projecting members 13, 14, 15 and the holes 16, 17, 18 along the direction parallel to the first cutting line L2 (arrow Y) are increasing toward the first cutting line L2. Thus, the metal joint body 1A surrounded with the pair of bending lines L1 arranging the first cutting line 12 therebetween and the second cutting lines L3 is shaped into an ellipse.

Figure 1:
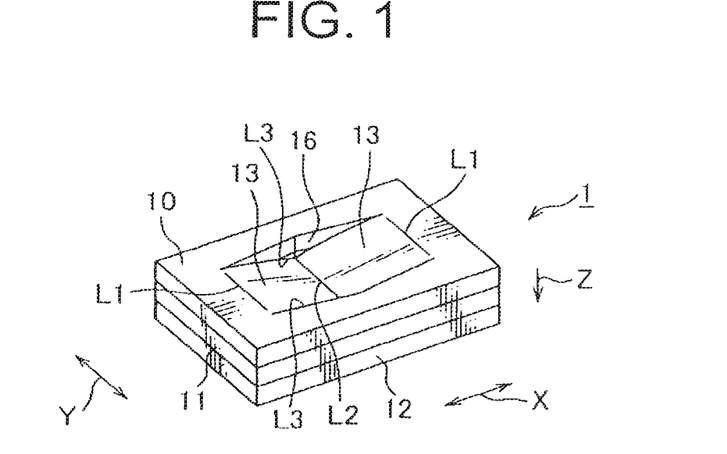
FIG. 1 is a perspective view of a metal joint body of a first embodiment according to the present invention.

According to the metal joint body 1, 1A mentioned above, by cutting three overlapped metal sheets 10, 11, 12 along the first cutting line L2 and the pair of second cutting lines L3 extending so as to intersect the first cutting line L2 at each end of the first cutting line L2; and pressing areas surrounded with the first cutting line L2 and the pair of second cutting lines L3 and each of the pair of bending lines L1 connecting both ends of the pair of second cutting lines L3 so as to bend the each area about the bending line L1, the first cutting line L2 is arranged between the pair of bending lines L1. Thereby, the metal joint body 1, 1A miniaturized in the direction of row of the pair of bending lines L1 (arrow X) can be manufactured.

The widths of the projecting members 13, 14, 15 and the holes 16, 17, 18 along the direction parallel to the first cutting line L2 (arrow Y) are increasing toward the first cutting line L2, so that the projecting members 13, 14 are pushed into the holes 17, 18. Thereby, normal loads are produced at the outer surrounding cutting surfaces of the projecting members 13, 14 and the inner surrounding cutting surfaces of the holes 17, 18. Thus, joining of the metal joint area 19 is advanced so that the electric characteristics and reliability thereof are further improved.

Figure 8:
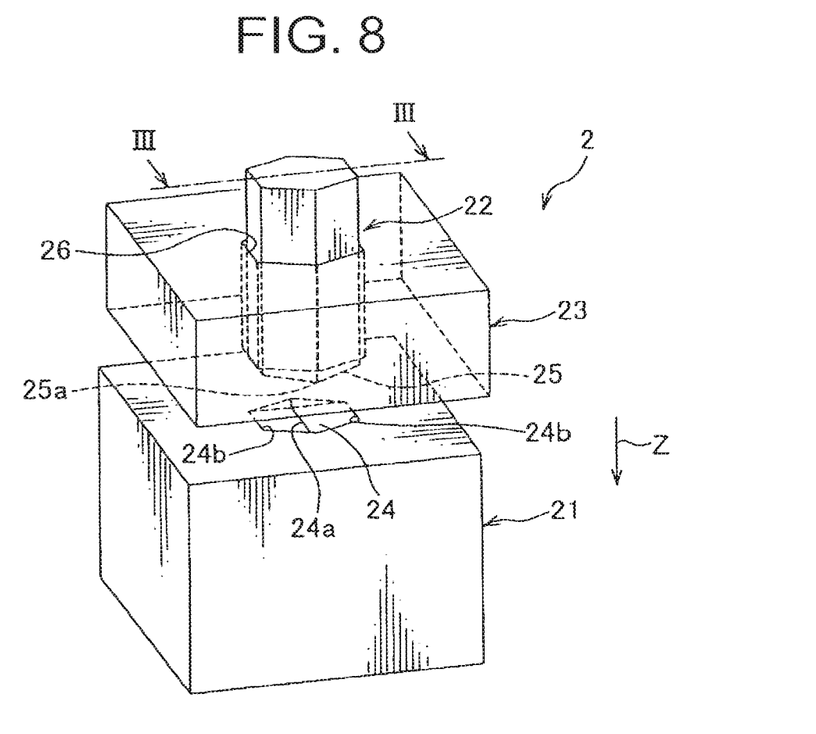
FIG. 8 is a perspective view of an apparatus for manufacturing the metal joint body of one embodiment according to the present invention.
Figure 9A:
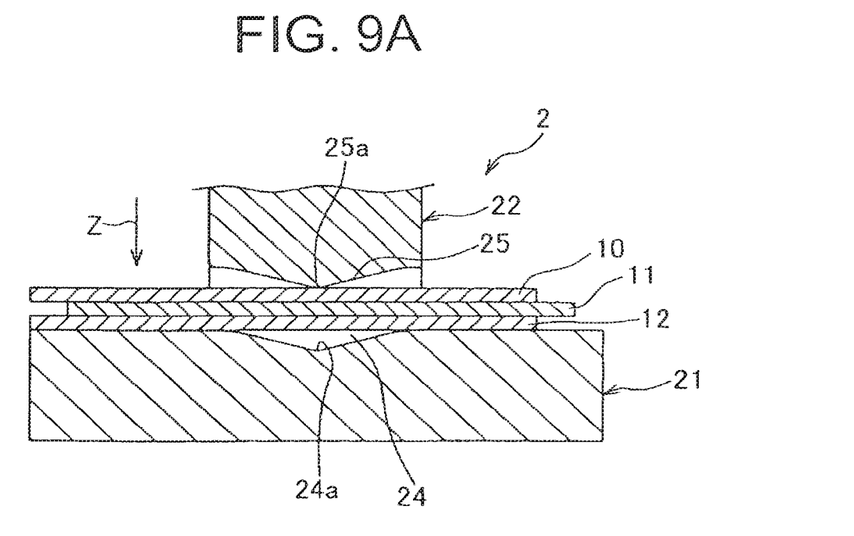
FIG. 9A is a cross-sectional view taken along the line IX-IX of the apparatus shown in FIG. 8, which is pressing three overlapped metal sheets.
Figure 9B:
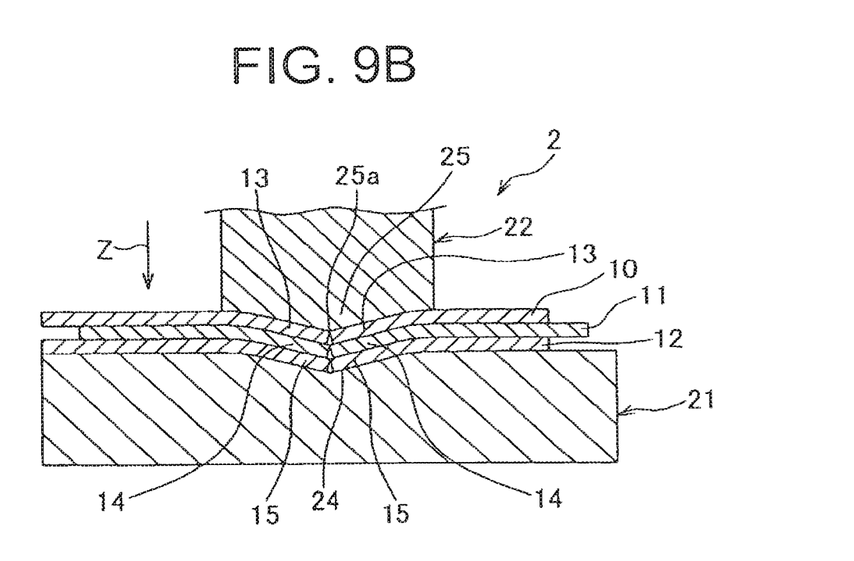
FIG. 9B is a cross-sectional view taken along the line IX-IX of the apparatus shown in FIG. 8, which finished joining three overlapped metal sheets.

An apparatus for manufacturing the metal joint body 1, 1A mentioned above will be described with reference to FIGS. 8, 9. As shown in FIGS. 8, 9, the apparatus 2 for manufacturing metal joint body includes a first die 21, a second die 22 and a guide 23.

The first die 21 is arranged with a rectangular parallelepiped shape, on a top surface of which a press hole 24 is provided. The press hole 24 is formed same as an area surrounded with the second cutting lines L3 and the bending lines L1 (hexagonal shape). The press hole 24 is formed into a V-shape in cross-sectional view gradually shallower from a bottom 24a corresponding to the first cutting line L2 toward each of edges 24b corresponding to each of the pair of the bending lines L1. The edges 24b are formed in even plane as the top surface, or not deep of cutting off the metal sheets 10, 11, 12.

The second die 22 is formed into a rod shape same as an area surrounded with the second cutting lines L3 and the bending lines L1 (hexagonal shape). The second die 22 is provided with a pressing projection 25 formed to be fitted to the press hole 24. The pressing projection 25 is formed slant to be gradually narrower toward a top 25a corresponding to the bottom 24a of the press hole 24.

The guide 23 is formed into a rectangular shape having a guide hole 26 corresponding to the press hole 24 of the first die 21. The guide hole 26 penetrates through the guide 23 along the pressing direction (arrow Z). The guide hole 26 is formed same as the area surrounded with the second cutting lines L3 and the bending lines L1 of the metal sheets 10, 11, 12 (hexagonal shape) so as to guide the second die 22 to the press hole 24 of the first die 21.

A method of manufacturing the metal joint body 1, 1A will be described by using the above apparatus 2. As shown in FIG. 9A, at first, the three overlapped metal sheets 10, 11, 12 are arranged on the top of the first die 21. After that, the second die 22 is moved along the guide hole 26 of the guide 23 in the pressing direction (arrow Z), and the three overlapped metal sheets 10, 11, 12 are clamped between the first die 21 and the second die 22.

The second die 22 is further moved, so that the three overlapped metal sheets 10, 11, 12 are sheared along the first cutting line L2 and the second cutting lines L3 by edges of the pressing projection 25 along cutting lines L2, L3 and edges of the press hole 24 along the cutting lines L2, L3. Simultaneously, each of the areas surrounded with the first cutting line L2 and the second cutting lines L3 of the three overlapped metal sheets 10, 11, 12 is pressed in the pressing direction, arrow Z, so as to be bent about each of the pair of bending lines L1. The pair of projecting members 13 of the first metal sheet 10 is pushed into the hole 17 of the second metal sheet 11, and pair of projecting members 14 of the metal second sheet 11 is pushed into the hole 18 of the third metal sheet 12. The outer surrounding cutting surfaces of the pair of projecting members 13, 14 and the inner surrounding cutting surfaces of the holes 17, 18 are adhered to each other, and the metal contact area 19 is produced. Thus, the metal joint body 1, 1A having the metal contact area 19 is completed.

A die by prior art includes a pair of press jigs arranged with a space to each other corresponding to the pair of projecting members 113. In contrast, according to the apparatus for manufacturing metal joint body, the apparatus 2 for manufacturing the metal joint body 1, 1A includes one pressing projection 25 for forming the pair of projecting members 13, 14, 15. The one pressing projection 25 can be formed in a sufficient size, so that the apparatus for manufacturing metal joint body can be improved about strength.

In the above embodiment, the metal joint body 1, 1A joins three metal sheets 10, 11, 12. The present invention is not limited above, and the metal joint body 1, 1A can join two or more metal sheets.

In the above embodiment, the metal joint body 1, 1A joins the metal sheets 10, 11, 12 made of the same material. The present invention is not limited above, and it is confirmed that metal joining for metal sheets made of different metal, such as Sn, Zn, Au and Ag, can be performed when two or more metal sheets can be pressed and sheared. In short, at least one metal sheet during two or more metal sheets may be made of different material.

At least one metal sheet during two or more metal sheets may be plated with Sn, Zn, Au and Ag. At least one metal sheet during two or more metal sheets can be softer by plating, so that the metal sheets can be easily sheared by small force over the yield stress.

In the above embodiment, the metal joint body 1, 1A joins the metal sheets 10, 11, 12 having the same thickness. The present invention is not limited above, and it is confirmed that metal joining for metal sheets having different thickness can be performed when two or more metal sheets can be pressed and sheared. In short, it is confirmed that joining of metal sheets having at least one metal sheet during two or more metal sheets can be performed.

In the above embodiment, the widths of the projecting members 13, 14, 15 and the holes 16, 17, 18 along the direction parallel to the first cutting line L2 (arrow Y) are provided so as to increase toward the first cutting line L2. The present invention is not limited above, and the widths can be constant.

In the above embodiment, the metal joint body 1, 1A is manufactured by cutting and pressing metal sheets 10, 11, 12. The present invention is not limited above, and the overlapped metal sheets 10, 11, 12 can be cut and pressed and simultaneously or after cutting and pressing, by heating, the metal sheets 10, 11, 12 can be diffused to each other, for improving strength of joint by diffusion.

While, in the embodiment, the present invention is described, it is not limited thereto. Various change and modifications can be made with the scope of the present invention.

The invention claimed is:

1. A method of making a metal joint body formed by joining two or more metal sheets to each other, the metal joint body including; a pair of projecting members formed by cutting the two or more overlapped metal sheets along a first cutting line and a pair of second cutting lines extending so as to intersect the first cutting line at each end of the first cutting line, and pressing areas each surrounded by the first cutting line, the pair of second cutting lines, and each of a pair of bending lines connecting both ends of the pair of second cutting lines, so as to bend each of the areas about each of the bending lines and project the areas in a pressing direction; a hole formed by arranging the projecting members; and a metal contact area arranged between an outer surrounding cutting surface of the projecting member and an inner surrounding cutting surface of the hole arranged opposite to the outer surrounding cutting surface, wherein said first and second cutting lines forms a trapezoidal shape together, with the first cutting line being a long side, the method comprising the steps of:

arranging the two or more overlapped metal sheets on a first die;

moving a second die in the pressing direction so as to clamp the overlapped metal sheets between the first die and the second die;

further moving the second die so as to shear the overlapped metal sheets along the first cutting line and the second cutting lines whereby physical contact between at least some of the respective metal sheets is maintained both at the first cutting line and at the second cutting lines; and pressing each of areas surrounded by the first and second cutting lines of the two or more overlapped metal sheets in the pressing direction to bend along the bending line, pushing the projecting members into the hole formed in the metal sheets, so that the outer surrounding cutting surface and the inner surrounding cutting surface are adhered to each other so as to form the metal contact area.

2. The method according to claim 1, further comprising steps of:

arranging the first die with a top surface provided with a press hole formed in a hexagonal shape corresponding to two opposing trapezoidal shapes; and arranging the second die with a tip provided with a pressing projection formed in the hexagonal shape corresponding to the press hole of the first die.

3. The method according to claim 1, wherein during a single moving step of the second die in the pressing direction, the overlapped metal sheets between the first and second dies are clamped; the overlapped metal sheets along the first cutting line and the second cutting lines are sheared; each of areas surrounded by the first and second cutting lines of the two or more overlapped metal sheets is pressed in the pressing direction and bent along the bending line; the projecting members are pushed into the hole formed in the metal sheets; and the metal contact area is formed at the outer surrounding cutting surface and the inner surrounding cutting surface.

4. The method according to claim 1, further comprising the step of providing metal sheets made of different metals selected from the group consisting of: Sn, Zn, Au and Ag.

5. The method according to claim 1, further comprising the step of providing metal sheets plated with different metals selected from the group consisting of: Sn, Zn, Au and Ag.

6. The method according to claim 1, further comprising the step of providing metal sheets having the same thickness.

7. The method according to claim 1, further comprising the step of providing metal sheets having different thicknesses.

8. The method according to claim 1, wherein the length of the first cutting line is larger than the length of the bending lines.

9. The method according to claim 1, wherein the length of the first cutting line is constant with the length of the bending lines.

10. A method of making a metal joint body of two or more metal sheets, comprising the steps of:

arranging a first die with a top surface provided with a press hole formed in a rectangular parallelepiped shape corresponding to two opposing rectangular parallelepiped shapes; and arranging a second die with a tip provided with a pressing projection formed in the rectangular parallelepiped shape corresponding to the press hole of the first die;

arranging the two or more metal sheets on the first die; and while moving the second die in a pressing direction towards the first die, clamping the metal sheets between the first and second dies;

shearing the metal sheets along cutting lines formed along a part of the rectangular parallelepiped shapes, whereby physical contact between at least some of the respective metal sheets is maintained both at the first cutting line and at the second cutting lines;

pressing areas of the metal sheets surrounded by the cutting lines in the pressing direction;

bending the metal sheets along bending lines formed along another part of the rectangular parallelepiped shapes;

pushing a pair of projecting members each of which is in each rectangular parallelepiped shape, into a hole of the metal sheets; and forming a metal contact area between an outer surrounding cutting surface of each projecting member and an inner surrounding cutting surface of the hole of the metal sheets formed opposite to the outer surrounding cutting surface.

11. A method of making a metal joint body of two or more metal sheets, comprising the steps of:

arranging a first die with a top surface provided with a press hole formed in a rectangular parallelepiped shape corresponding to two opposing rectangular parallelepiped shapes; and arranging a second die with a tip provided with a pressing projection formed in the rectangular parallelepiped shape corresponding to the press hole of the first die;

arranging the two or more metal sheets on the first die; and while moving the second die in a pressing direction towards the first die, clamping the metal sheets between the first and second dies;

shearing the metal sheets along cutting lines formed along a part of the rectangular parallelepiped shapes;

bending the metal sheets along bending lines formed along another part of the rectangular parallelepiped shapes;

pushing a pair of projecting members each of which is in each rectangular parallelepiped shape as far as a lowermost metal sheet of the two or more overlapped metal sheets is maintained within a hole formed in the metal sheets; and forming a metal contact area between an outer surrounding cutting surface of each projecting member and an inner surrounding cutting surface of the hole of the metal sheets formed opposite to the outer surrounding cutting surface.

* * * * *